United States Patent [19]

Ikenaga et al.

[11] Patent Number: 5,035,544
[45] Date of Patent: Jul. 30, 1991

[54] INSERT CLAMPED TOOL

[75] Inventors: Kouichi Ikenaga; Tatsuo Arai, both of Tokyo, Japan

[73] Assignee: Mitsubishi Metal Corporation, Tokyo, Japan

[21] Appl. No.: 524,473

[22] Filed: May 17, 1990

[30] Foreign Application Priority Data

May 19, 1989 [JP] Japan ................. 1-57625[U]

[51] Int. Cl.⁵ ............................................ B23B 27/16
[52] U.S. Cl. ..................................... 407/105; 407/48; 407/107
[58] Field of Search ............... 407/48, 103, 104, 105, 407/107, 2–6; 408/144, 145, 187, 188, 197, 198, 233

[56] References Cited

U.S. PATENT DOCUMENTS

| | | | |
|---|---|---|---|
| 3,171,188 | 3/1965 | Stier | 407/104 X |
| 3,341,923 | 9/1967 | Kelm | 407/104 |
| 4,050,127 | 9/1977 | Bodem et al. | 407/107 |
| 4,283,163 | 8/1981 | Gräte et al. | 407/104 |
| 4,309,132 | 1/1982 | Adamson et al. | 407/48 X |

FOREIGN PATENT DOCUMENTS

| | | |
|---|---|---|
| 1552296 | 11/1971 | Fed. Rep. of Germany . |
| 49-89271 | 8/1974 | Japan . |
| 53-90089 | 8/1978 | Japan . |
| 53-90090 | 8/1978 | Japan . |
| 53-101392 | 8/1978 | Japan . |
| 53-116090 | 9/1978 | Japan . |
| 53-116890 | 9/1978 | Japan . |
| 53-117880 | 10/1978 | Japan . |
| 53-117881 | 10/1978 | Japan . |
| 53-117882 | 10/1978 | Japan . |
| 0140687 | 12/1978 | Japan ..................... 407/103 |
| 54-73584 | 5/1979 | Japan . |
| 54-174082 | 12/1979 | Japan . |
| 55-115705 | 8/1980 | Japan . |
| 56-67902 | 6/1981 | Japan . |
| 56-171103 | 12/1981 | Japan . |
| 57-3502 | 1/1982 | Japan . |
| 58-47405 | 3/1983 | Japan . |
| 58-48282 | 10/1983 | Japan . |
| 2-15803 | 1/1990 | Japan . |
| 2-51006 | 4/1990 | Japan . |
| 1341651 | 12/1973 | United Kingdom . |
| 1479433 | 7/1977 | United Kingdom . |
| 2041797 | 9/1980 | United Kingdom . |

Primary Examiner—Z. R. Bilinsky
Attorney, Agent, or Firm—Cushman, Darby & Cushman

[57] ABSTRACT

There is disclosed an insert clamped tool which has a tool holder including a recess formed at a forward end thereof and defining an insert-receiving seat. The tool holder has a pin-receiving hole formed therein so as to open to the insert-receiving seat and having a tapered portion. A positioning pin is releasably received in the hole of the tool holder. The positioning pin has an engaging portion formed at one end thereof and a tapered portion fitted in the tapered portion of the hole. A cutting insert having a mounting bore formed therethrough is received on the insert-receiving seat in such a manner that the engaging portion of the positioning pin is held in abutting engagement with the mounting bore of the insert. A clamp mechanism is arranged on the tool holder for pressing the insert against the insert-receiving seat and the engaging portion of the positioning pin.

2 Claims, 2 Drawing Sheets

FIG.4 (PRIOR ART)
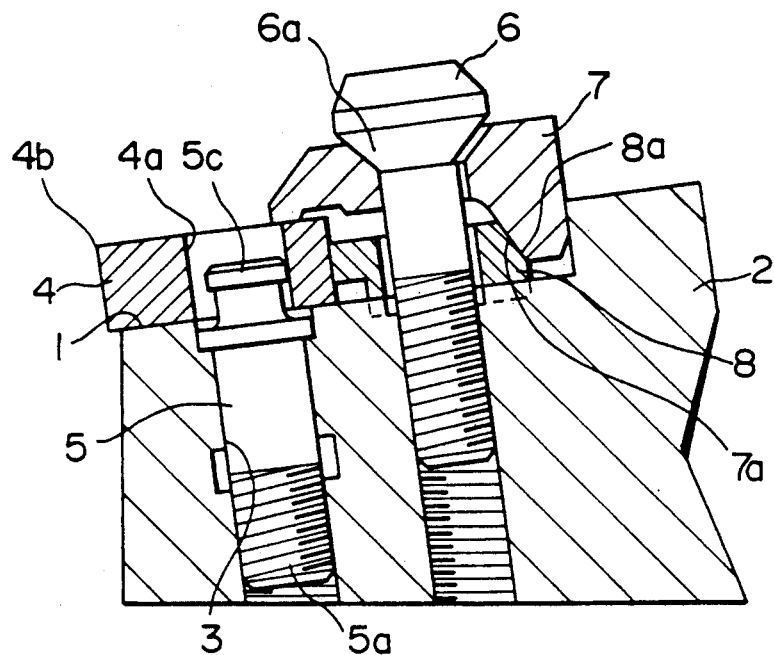
FIG.5 (PRIOR ART)
FIG.6 (PRIOR ART)
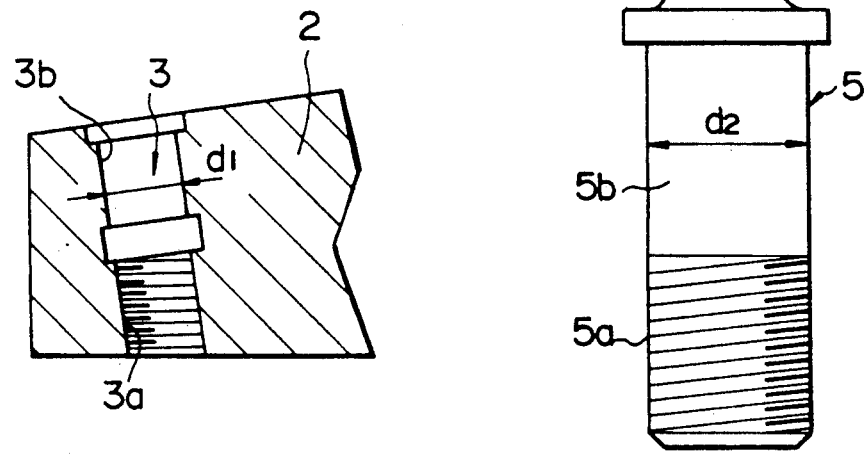

5,035,544

INSERT CLAMPED TOOL

BACKGROUND OF THE INVENTION

1. Field of the Invention

The present invention pertains to a clamped tool having a cutting insert releasably secured to a tool holder, and in particular to the improvement in an assembly for clamping a cutting insert with a mounting bore on the tool holder.

2. Prior Art

FIGS. 4 to 6 depict a conventional insert clamped tool which comprises a tool holder 2 having an insert-receiving seat 1 or recess formed at its forward end and a pin-receiving hole 3 opening to the insert-receiving seat 1. A throwaway cutting insert 4 with a mounting bore 4a formed therethrough is received on the insert-receiving seat 1, and a positioning pin 5 is received in the pin-receiving hole 3 so that its head portion 5c protrudes from the seat 1 to engage with the mounting bore 4a of the insert 4. A clamp 7 is disposed at a position shifted rearward of the tool holder 2 relative to the pin 5, and a clamp plate 8 is interposed between the clamp 7 and the seat 1 with its rear wedge face 8a being held in abutment with a complementary wedge face 7a formed at a rear portion of the clamp 7. A clamp bolt 6 is inserted through the clamp 7 and the clamp plate 8 and screwed into the tool holder 2.

The positioning pin 5 has an externally threaded portion 5a screw-fit in an internally threaded portion 3a of the pin-receiving hole 3, an engaging pin portion 5b fit in a straight portion 3b of the pin-receiving hole 3, and an insert engaging portion 5c held in engagement with the mounting bore 4a of the insert 4. The positioning pin 5 is thus subject to the force caused from the clamp plate 8 to prevent the insert 4 from moving along the insert-receiving seat 1.

In the clamped tool described above, when the clamp bolt 6 is tightened, the insert 4 is pressed by the clamp 7 against the insert-receiving seat 1, and the clamp plate 8 is pressed forward of the tool due to a wedging effect, caused between a head 6a of the clamp bolt 6 and the clamp 7, and a wedging effect, caused between the wedge face 7a of the clamp 7 and the wedge face 8a of the clamp plate 8. Thus, the insert engaging portion 5c of the positioning pin 5 and the mounting bore 4a of the insert 4 are brought into abutting engagement with each other, so that the movement of the insert 4 along the insert-receiving seat 1 can be prevented.

In the aforesaid conventional clamped tool, the inner diameter $d_1$ of the straight portion 3b of the pin-receiving hole 3 is set somewhat greater than the diameter $d_2$ of the engaging portion 5b of the positioning pin 5. Therefore, when clamping the insert 4, the positioning pin 5 undergoes a pressing force from the clamp plate 8 and is caused to move within the pin-receiving hole 3. As a result, the position of a cutting edge 4b of the insert 4 in a longitudinal direction of the tool varies during the clamping operation, and hence it has been difficult to position the cutting edge 4b in place.

Furthermore, inasmuch as the inner diameter $d_1$ of the straight portion 3b of the pin-receiving hole 3 is greater than the diameter $d_2$ of the engaging pin portion 5b of the positioning pin 5, the straight portion 3b and the engaging pin portion 5b contact each other only at a point or a line. Therefore, the pressing force caused from the clamp plate 8 concentrates on the contact portions, exerting a strong bending force on the positioning pin 5 which can damage it.

Moreover, when the difference between the inner diameter $d_1$ of the pin-receiving hole 3 and the diameter $d_2$ of the positioning pin 5 is set small, it sometimes happens that the positioning pin 5 cannot be inserted into the pin-receiving hole 3. On the other hand, if the above difference is great, the amount of the movement of the positioning pin 5 tends to become large, making the disadvantage described above more crucial. Accordingly, the tolerance for the difference between the diameters $d_1$ and $d_2$ must be strictly set to a desired value, resulting in a lowering of yields and an increase in machining cost.

SUMMARY OF THE INVENTION

It is therefore an object of the present invention to provide an insert clamped tool in which the movement of the positioning pin during clamping can be positively prevented to securely keep the insert in position.

Another object of the invention is to provide an insert clamped tool in which force does not concentrate on the positioning pin, so that the damage of the pin can be prevented, and in which the manufacturing tolerance for the positioning pin and the pin-receiving hole of the tool holder can be moderated.

According to the present invention, there is provided a tool holder including a recess formed at a forward end thereof and defining an insert-receiving seat and a pin-receiving hole formed therein so as to open to the insert-receiving seat and having a tapered portion; a positioning pin releasably received in the pin-receiving hole of the too holder and having an engaging portion formed at one end thereof and disposed so as to protrude from the insert-receiving seat, the positioning pin having a tapered portion fitted in the tapered portion of the pin-receiving hole; a cutting insert having a mounting bore formed therethrough and received on the insert-receiving seat in such a manner that the engaging portion of the positioning pin is held in abutting engagement with the mounting bore of the insert; and clamp means arranged on the tool holder for pressing the insert against the insert-receiving seat and the engaging portion of the positioning pin.

BRIEF DESCRIPTION OF THE DRAWINGS

FIG. 4 is a view similar to FIG. 1, but showing a conventional clamped tool;

FIG. 5 is a cross-sectional view of a part of the tool holder of the tool of FIG. 4; and FIG. 6 is an enlarged view of the positioning pin employed in the clamped tool of FIG. 4.

DESCRIPTION OF THE PREFERRED EMBODIMENTS OF THE INVENTION

Figure 1:
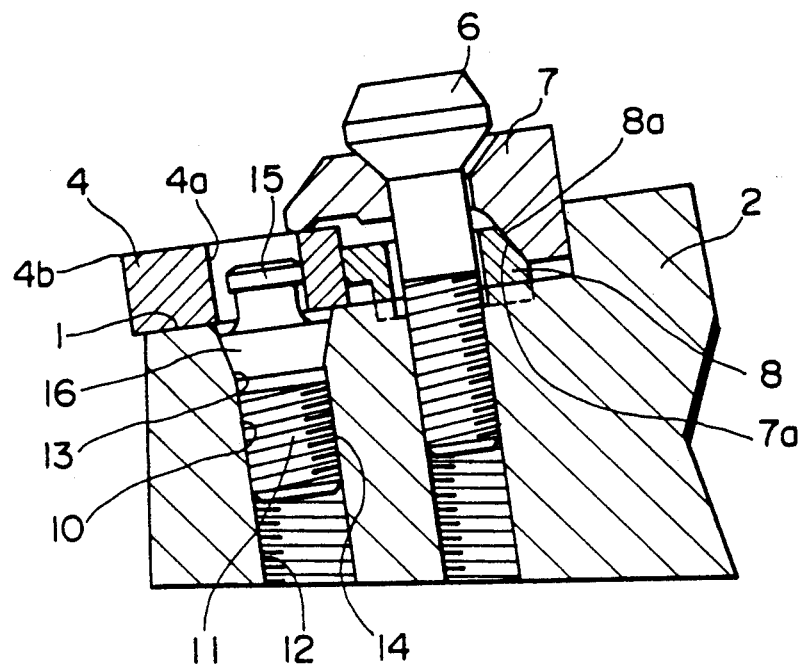
FIG. 1 is a cross-sectional view of a part of an insert clamped tool in accordance with the present invention.
Figure 2:
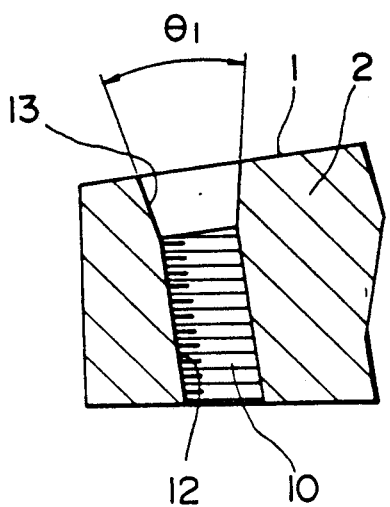
FIG. 2 is a cross-sectional view of a part of a tool holder of the clamped tool of FIG. 1.
Figure 3:
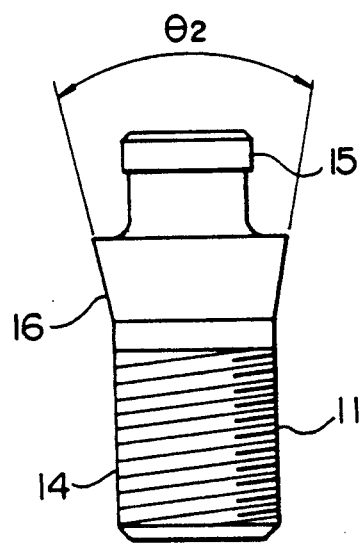
FIG. 3 is an enlarged view of a positioning pin employed in the clamped tool of FIG. 1.

FIGS. 1 to 3 depict an insert clamped tool in accordance with an embodiment of the present invention, in which the same numerals as in the conventional tool are used to designate the same or similar parts in order to avoid repetition of the explanation.

As shown in FIG. 1, the clamped tool of the present embodiment comprises a tool holder 2 having a recess formed at its forward end and defining an insert-receiving seat 1 and a pin-receiving hole 10 formed therethrough and opening to the insert-receiving seat 1. A throwaway cutting insert 4 with a mounting bore 4a formed therethrough is received on the insert-receiving seat 1, and a positioning pin 11 is received in the pin-receiving hole 10 so that its one end portion protrudes from the seat 1 to engage with the mounting bore 4a of the insert 4. A clamp 7 for pressing the insert 4 against the insert-receiving seat 1 is disposed at a position shifted rearward of the tool holder 2 relative to the positioning pin 11, and a pressing member in the form of a clamp plate 8, for pressing the insert 4 in a direction parallel to the insert-receiving seat 1, is interposed between the clamp 7 and the seat 1 with its rear wedge face 8a being held in abutting engagement with a complementary wedge face 7a formed at a rear portion of the clamp 7. A clamp bolt 6 is inserted through the clamp 7 and the clamp plate 8 and screwed into the tool holder 2.

The above pin-receiving hole 10, which extends perpendicular to the insert-receiving seat 1, has a tapered portion disposed adjacent to the insert-receiving sea 1 and tapering inwardly of the holder, and an internally threaded portion 12 extending from the tapered portion to the rear face of the tool holder 2.

As illustrated in FIG. 3, the one end portion of the positioning pin 11 is formed into a flange shape to define a insert engaging portion 5c to be held in engagement with the inner peripheral surface of the mounting bore 4a of the insert 4. The positioning pin 11 is also provided with an externally threaded portion 14 formed at the other end portion so as to be screw-fit in the internally threaded portion 12 of the pin-receiving hole 10, and with a tapered portion 16 formed between the externally threaded portion 14 and the insert engaging portion 12 so as to taper toward the externally threaded portion 14. A tapering angle $\theta_2$ of the tapered portion 16 is set slightly greater than a tapering angle $\theta_1$ of the tapered portion 13 of the pin-receiving hole 10.

When clamping the insert 4 to the tool holder 2, the positioning pin 11 is first inserted and screwed into the pin-receiving hole 10 so that the externally threaded portion 14 is threadedly engaged with the internally threaded portion 12, and thus the positioning pin 11 is caused to move inward of the tool holder 2 to bring the tapered portions 13 and 16 into abutting contact with each other.

Then, the insert 4 is received on the insert-receiving seat 1 in such a manner that the insert engaging portion 15 of the positioning pin 11, which is protruded from the insert-receiving seat 1, is held in abutting engagement with the mounting bore 4a of the insert 4. Subsequently, the clamp bolt 6 is tightened to cause the clamp 7 to press the insert 4 against the insert-receiving seat 1, and to press the clamp plate 8 forward of the tool to bring the insert engaging portion 15 of the positioning pin 11 into abutting engagement with the mounting bore 4a of the insert 4.

In the foregoing, as the clamp bolt 6 is tightened, the positioning pin 11 is gradually pressed forward of the tool holder. Since the tapered portion 13 of the hole 10 an the tapered portion of the positioning pin 11 are held in intimate contact with each other, the position of the positioning pin 11 in its radial direction does not change during the clamping operation. Accordingly, the position of the cutting edge 4a of the insert 4 does not change either during the clamping operation, and hence the cutting edge 4b can be kept at a desired position in a longitudinal direction of the tool.

Furthermore, when the positioning pin 11 is tightened, the tapered portion 16 of the positioning pin 11 is entirely brought into intimate contact with the inner peripheral surface of the tapered portion 13 of the pin-receiving hole 13 without forming any gap therebetween. Accordingly, the pressing force exerted on the positioning pin 11 is transmitted to the entire circumference of the tapered portion 13 of the pin-receiving hole 10. Therefore, the positioning pin 11 is less susceptible to a bending force, so that the damage of the pin 11 can be avoided.

Moreover, even though the tapering angles $\theta_1$ and $\theta_2$ of the tapered portions 13 and 16 are not set equal, both of the tapered portions 13 and 16 are brought into close contact for the tapering angles $\theta_1$ and $\theta_2$ can be moderated. Therefore, the manufacture of the positioning pin 11 and the formation of the mounting bore 4a become easy, so that the yields in the manufacture can be increased and the manufacturing cost can be reduced.

Furthermore, in the illustrated embodiment, since the positioning pin 11 is held in intimate contact with the pin-receiving hole 10, the lengths of the contacting portions in an axial direction of the pin can be reduced compared with that in the conventional tool, and hence the entire axial lengths of the tapered portions 13 and 16 can be substantially reduced. For this reason, even when a tool holder of which the thickness is not sufficient to ensure a pin-receiving hole 10 of a sufficient length, a sufficient length can be ensured for threaded engagement in order to clamp the insert 4 firmly.

In the above embodiment, the insert 4 is clamped by two members, i.e., the clamp 7 and the clamp plate 8. However, the two members may be replaced by a single member which is formed and arranged to press the rear end of the insert 4 in a direction obliquely intersecting the axis of the positioning pin 11, to thereby press the insert 4 against the insert-receiving seat 1 and the positioning pin 11. In addition, the positioning pin 11 may be modified so that it can be inserted from the rear face of the tool holder. In such a case, the tapered portions of the positioning pin and hole are formed so as to taper toward the insert-receiving seat 1.

As described above, in the clamped tool of the present invention, tapered portions tapering toward one of opposite ends of the positioning pin are formed at both of the pin-receiving hole of the tool holder and the positioning pin. These tapered portions are held in intimate contact with each other by moving the positioning pin axially thereof, and the movement of the positioning pin in its radial direction is positively prevented. Hence, the clamped tool of the invention has the following advantages:

(1) Even though a pressing force caused by the clamp plate is exerted on the positioning pin, the position of the pin in its radial direction does not change. Therefore, the insert can be easily positioned in a desired place.

(2) The pressing force exerted on the positioning pin is transmitted to the entire circumference of the tapered portion of the pin-receiving hole. Therefore, the positioning pin is less susceptible to a bending force, so that the damage of the pin can be avoided.

(3) Even though the tapering angles of the tapered portions are not set equal, both of the tapered portions can always be brought into close contact, and the tolerance for the tapered portions can be moderated. Therefore, the yields in the manufacture can be increased and the manufacturing cost can be reduced.

(4) The length of the contacting portions in an axial direction of the pin is reduced compared with that in the conventional tool, and hence entire axial lengths of the tapered portions can be substantially reduced. For this reason, even when a tool holder of which the thickness is not sufficient to ensure a pin-receiving hole of a sufficient length, a sufficient length can be ensured for threaded engagement in order to clamp the insert firmly.

What is claimed is:

1. A clamped tool having an insert comprising:
   (a) a tool holder including a recess formed at a forward end thereof and defining an insert-receiving seat and a pin-receiving hole formed therein so as to open to said insert-receiving seat, said pin-receiving hole having an internally threaded portion and a tapered portion disposed adjacent to said internally threaded portion so as to taper in a direction away from said insert-receiving seat;
   (b) a positioning pin releasably received in said pin-receiving hole of said tool holder and having an engaging portion formed at one end thereof and disposed so as to protrude from said insert-receiving seat, said positioning pin having an externally threaded portion that threadedly engages with said internally threaded portion of said pin-receiving hole and a tapered portion disposed adjacent to said externally threaded portion so as to taper in a direction away from said insert-receiving seat, said tapered portion being held entirely in intimate contact with said tapered portion of said pin-receiving hole;
   (c) a cutting insert having a mounting bore formed therethrough and received on said insert-receiving seat in such a manner that said engaging portion of said positioning pin is held in abutting engagement with said mounting bore of said insert; and
   (d) clamp means including a pressing member disposed on said insert-receiving seat so as to be movable toward and away from said insert, a clamp arranged on said pressing member for pressing said insert against said insert-receiving seat and pressing said pressing member against said insert and a clamp screw screwed into said tool holder for fixedly securing said clamp on said tool holder.

2. A tool according to claim 1, in which said tapered portion of said pin-receiving hole has a tapering angle smaller than that of said tapered portion of said positioning pin.

* * * * *